Feb. 28, 1961 — C. F. SCHAUM — 2,973,218
LIFTER
Filed July 30, 1959

INVENTOR.
CLYDE F. SCHAUM
BY
Angus & Mon
ATTORNEYS.

2,973,218
LIFTER

Clyde F. Schaum, 40 S. Grand Ave., Pasadena, Calif.

Filed July 30, 1959, Ser. No. 830,527

1 Claim. (Cl. 294—1)

This invention relates to a lifter particularly useful for handling foods such as fowl and roasts.

The inconvenience and messiness of handling greased fowl and larded roasts both before and after cooking them is well known. The cook has the choice of getting his hands messy and perhaps burned by directly handling them, or on the other hand may attempt to handle them with instruments which tend to bruise, cut, or split the fowl or roasts, thereby spoiling their appearance and rendering them less appetizing. Still other known alternatives involve the use of complicated holders and racks which often are quite troublesome to clean up.

It is an object of this invention to provide a lifter by means of which a fowl or roast can be neatly and conveniently be lifted and carried before, during, and after cooking.

The invention comprises a spreader from opposite sides of which there project a plurality of flexible straps. The straps are held apart from each other by the spreader. A pair of handles are provided, the straps projecting from each side of the spreader, being attached to a respective one of the handles. The handles can be brought up and together to lift the fowl, the fowl resting on the spreader, and the straps lending side support for the fowl or roast.

According to an optional feature of the invention, the straps have a substantial width so as to render minor any tendency for them to cut into the cooked object.

The above and other features of this invention will be fully understood from the following detailed description and the accompanying drawings, in which.

Figure 1:
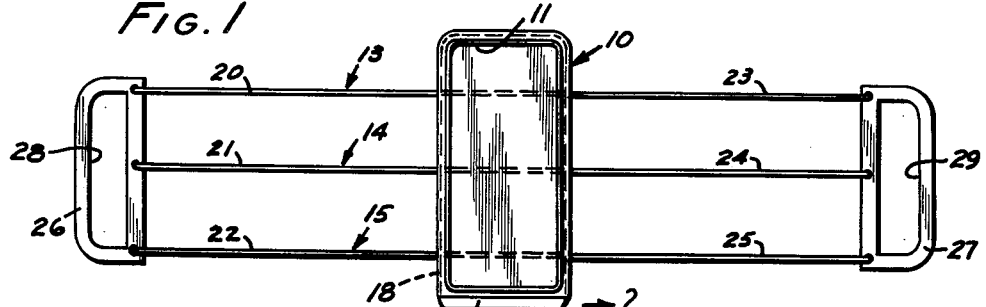
Fig. 1 is a plan view of the presently preferred embodiment of lifter according to the invention.
Figure 3:
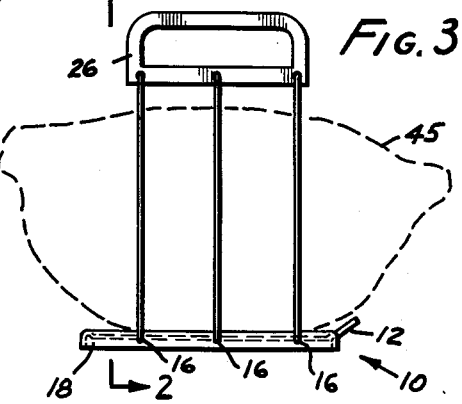
Fig. 3 is a side view of Fig. 2.

In Fig. 1 there is shown the presently preferred embodiment of the invention which includes a rigid spreader 10. The spreader has significant lateral and longitudinal dimensions, so that it can serve as a platform for a fowl or roast. A peripherial bead 11 is raised on the spreader near the edge thereof to restrain the fowl or roast from easily skidding off the spreader. At one end of the spreader there is a raised lip 12 which, as shown in Fig. 3, tends to hold the fowl or roast from skidding past the lip, and also serves as a convenient handle for tipping the spreader so as to slip the fowl or roast off of it.

Three lengths 13, 14, 15 of cord, wire, or any other flexible substance which is preferably not significantly elastic, are passed through laterally aligned holes 16 and 17 in side flanges 18, 19 of the spreader. The spreader thereby divides the lengths into straps 20, 21, 22 on the left side of the spreader in Fig. 1, and straps 23, 24, 25 on the right side thereof. If it is desired to adjust the length of the straps on opposite sides of the spreader, this can be accomplished simply by shifting the spreader along the lengths; thus, the straps on one side could be lengthened or shortened as dictated by the shape of the fowl or roast which is to be handled.

Handles 26, 27 are attached to the free ends of straps 20–22 and 23–25, respectively. The handles have handholes 28, 29, respectively.

The holes 16 and 17 in the side flanges are spaced apart by relatively rigid structure of the spreader. The side flanges of the spreader thus tend to hold the straps spaced from each other so that they do not bunch up. The straps thereby support the object along a substantial portion of its length.

The preferred materials for the embodiment of Fig. 1 are metallic. The spreader may be such as a metal tray, perhaps aluminum. The handles may conveniently be made of aluminum because this metal will cool down quickly from oven temperature. The straps may be wires, although it is preferable for them to have a somewhat substantial dimension of width in order to render minor their tendency to cut into the cooked fowl or roast, in which case metal strips may be used, holes 16 and 17 being slotted in shape.

Figure 5:
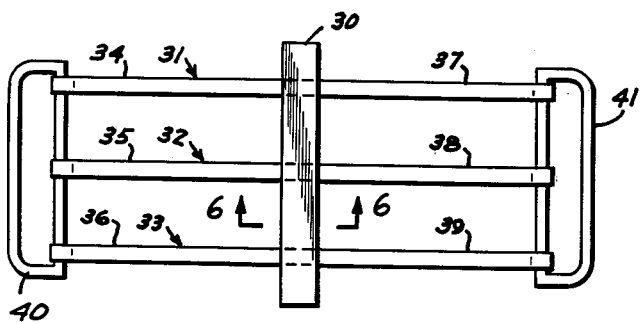
Fig. 5 is a plan view of another embodiment of the invention.
Figure 6:
Fig. 6 is a cross-section taken at line 6—6 of Fig. 5.

In Fig. 5 there is shown another embodiment of the invention which is particularly suited for manufacture out of plastic. In this embodiment, a spreader 30 may comprise a flat plate of fairly stiff plastic material to which there are bonded by means such as adhesive or the like (see Fig. 6) lengths 31, 32, 33 of plastic tape which project from each side of the spreader to form straps 34, 35, 36 which project from the left side in Fig. 5, and straps 37, 38, 39 which project from the right hand side. Handles 40, 41 which may also be of plastic, are attached to the free ends of straps 34–36 and 37–39, respectively. These straps have significant dimensions of width, as does the spreader. Although the lateral dimension of the spreader is not as great as the spreader of Fig. 1, still the spreader is of substantial area, and it and the straps will support the bird without a tendency to cut therein. The plastic embodiment is less likely to be cleaned up and re-used than is the metal embodiment of Fig. 1, and is more suitable for a "give-away" item. The plastic selected should, of course, be able to withstand ordinary cooking oven temperature.

The spreader need not be rigid, although it preferably is so. For example, in Fig. 5, spreader 30 might be a piece of canvas cloth to which the straps are attached. With such an embodiment it will be found that while there is some tendency for the straps to draw together when the fowl or roast is lifted, still there appears to be enough pressure exerted by the straps that they tend to indent themselves slightly into the fowl or roast, and do not draw together. The spreader acts to keep the end straps from falling off the fowl or roast entirely, as well as to keep them from bunching up.

Figure 2:
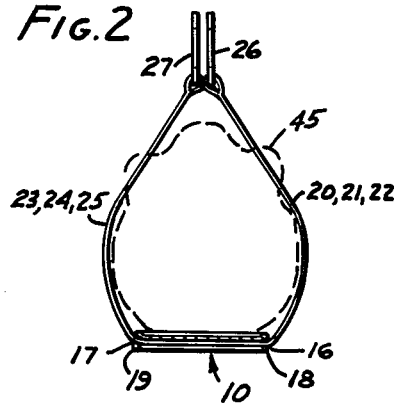
Fig. 2 is a cross-section taken at line 2—2 of Fig. 3, showing the lifter of Fig. 1 being used to lift a fowl.
Figure 4:
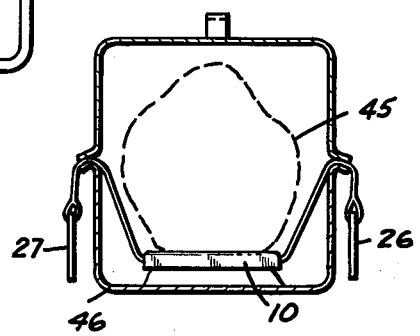
Fig. 4 is a cross-section showing the lifter in use in a roaster.

The use of this invention is evident from Figs. 2 and 4. Fig. 2 shows the handles brought together with the straps on each side of a fowl 45 which is resting upon spreader 10. A lift on the handles secures the bird firmly in the lifter, and it may easily be carried by the handles to a roasting pan 46 such as shown in Fig. 4. The handles and straps could if desired be left inside the roaster, but when the straps are relatively thin and flexible, which will usually be the case, the handles may be hung outside the roaster with the lid on or off as preferred, and will remain clean.

After the fowl or roast is cooked, the handles are brought together as shown in Fig. 2, and the fowl or roast may be transported by it to the place of service. The handles may be put to one side so as to release the straps and the spreader may be tipped to slide the fowl or roast onto the serving platter. If a flexible spreader is used in either of the embodiments, it is only necessary to tip the fowl or roast slightly from either end to remove the lifter from beneath the fowl.

This invention is not to be limited to the embodiments shown in the drawings and described in the description which are given by way of example and not of limitation, but only in accordance with the scope of the appended claim.

I claim:

A fowl and roast lifter comprising: a rigid platform having substantial longitudinal and lateral dimensions; a peripheral bead around the top of said platform; a pair of parallel, spaced-apart flanges extending downwardly from and projecting beneath said platform to space the bottom of the platform from a surface on which the flanges can be rested, each of said flanges having a plurality of holes therein, the holes in the opposite flanges being opposed across the platform; a continuous length of flexible material passing through the opposed holes in opposite flanges so as to provide a plurality of flexible straps projecting from each side of the platform; a pair of rigid handles joined to the free ends of said straps on each side of the platform, the straps being joined to the handles at spaced-apart locations thereon, the handles having a hand-hole therein, whereby the projecting length of said straps from the platform can be adjusted by shifting the platform along the lengths of material, and whereby a fowl or roast can be laid on said platform, and the handles lifted and brought together with the straps on opposite sides of the fowl or roast, whereby the fowl or roast can be lifted by the handles with the platform supporting its bottom and the straps supporting its sides, and the platform may be stood on its flanges on the bottom of a pan so as to space the platform therefrom and prevent scorching of the bottom of the fowl or roast.

References Cited in the file of this patent

UNITED STATES PATENTS

| | | |
|---|---|---|
| 96,647 | Yancy | Nov. 9, 1869 |
| 1,699,114 | Meagher | Jan. 15, 1929 |
| 2,297,332 | Stewart | Sept. 29, 1942 |
| 2,337,142 | Williams | Dec. 21, 1943 |
| 2,514,098 | Shreiner | July 4, 1950 |
| 2,703,046 | Ahlquist | Mar. 1, 1955 |